Feb. 7, 1967  P. F. PAGE  3,302,766
RIBBON HANDLING MECHANISM
Original Filed Sept. 12, 1962  9 Sheets-Sheet 3

INVENTOR
PAUL F. PAGE
BY Thomas S. Ross
Edward H Loveman
ATTORNEYS

Feb. 7, 1967 P. F. PAGE 3,302,766

RIBBON HANDLING MECHANISM

Original Filed Sept. 12, 1962 9 Sheets-Sheet 6

Fig_12

Fig_13

Fig_11

INVENTOR
PAUL F. PAGE
BY Thomas S. Ross
Edward H. Loveman
ATTORNEYS

Feb. 7, 1967 P. F. PAGE 3,302,766
RIBBON HANDLING MECHANISM
Original Filed Sept. 12, 1962 9 Sheets-Sheet 8

INVENTOR
PAUL F. PAGE
Thomas S. Ross
BY
Edward H. Loveman
ATTORNEYS

Fig-20

United States Patent Office 3,302,766
Patented Feb. 7, 1967

3,302,766
RIBBON HANDLING MECHANISM
Paul F. Page, Newington, Conn., assignor, by mesne assignments, to Royal Typewriter Company, Inc., New York, N.Y., a corporation of Delaware
Original application Sept. 12, 1962, Ser. No. 223,159. Divided and this application Oct. 22, 1965, Ser. No. 500,743
5 Claims. (Cl. 197—158)

This is a division of application Serial No. 223,159 filed September 12, 1962.

This invention relates to ribbon handling mechanism for a power operated writing machine and more particularly to a ribbon handling mechanism for use in a matrix type electric typewriter.

Mechanisms of the general type here under consideration have been in commercial use for some time and usually operate satisfactorily but uneconomically and with some inconvenience. Such a mechanism, as disclosed, for example, in U.S. Patents 2,919,008 and 2,902,136, is generally satisfactory where a one or two color reversible fabric ribbon is used but has certain inherent disadvantages when a carbon ribbon is being used, particularly in a matrix type machine. In such a machine the capacities of the carbon ribbon supply and take-up spools are relatively small as compared to those in a basket machine. As a conventional carbon ribbon cannot be reversed for re-use, its extent of utility is relatively small thus necessitating frequent replacement resulting in inconvenience, loss of time, and wastage of ribbon as less than half of the ribbon is used.

It is accordingly among the objects of this invention to provide a ribbon handling mechanism for a matrix type electric typewriter that substantially extends the ribbon's period of use and accordingly substantially reduces the incidence of ribbon replacement and the inconvenience and loss of time attendant thereto.

Another object is to provide such a mechanism that is simple and sturdy, of light-weight construction, and capable of efficient and silent operation over an extended service-free period of use.

Other objects will be in part apparent and in part pointed out hereinafter.

In the drawing wherein there is shown one embodiment of the invention and wherein similar reference characters refer to similar parts throughout the several views.

*Ribbon supports and vibrator arm drive*

Figures 1, 1A:
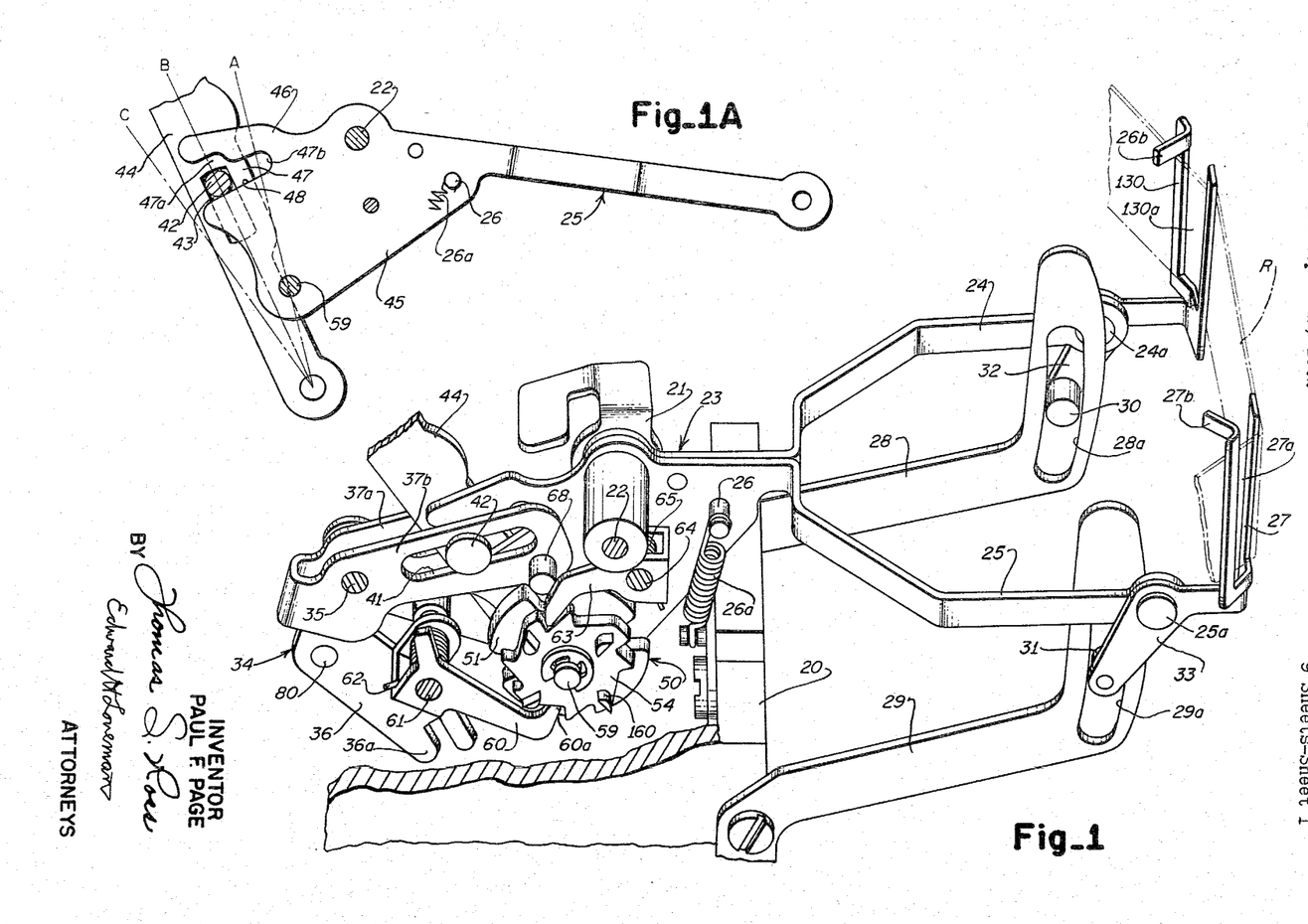
FIGURE 1 is an isometric view of the vibrator mechanism.
FIGURE 1A is an elevation of a vibrator arm.

As shown in FIGURE 1 a portion 20 of the typewriter frame supports a bracket 21 which carries a shaft 22 on which a ribbon vibrator assembly, generally indicated at 23, is rockably mounted. Vibrator 23 includes a pair of arms 24 and 25 provided respectively with ribbon supports 130 and 27 for a ribbon R which is adapted to be fed unidirectionally during successive typing operations in a manner described below. Arms 24 and 25 are substantially similar to the right of shaft 22 and are joined by a pin 26 which anchors one end of a return spring 26a, the other end of which is fastened to frame 20, spring 26a biasing the arms downwardly to their normal or rest position. Ribbon supports 130 and 27 are respectively controlled in their vertical reciprocatory movement by frame supported guides 28 and 29 which have cam slots 28a and 29a adapted to receive cam follower pins 30 and 31 respectively. Pins 30 and 31 are secured to the ends of crank levers 32 and 33 respectively which are integrally formed with their respective ribbon supports 130 and 27 and are pivotally mounted to the ends of arms 24 and 25 by pins 24a and 25a. Thus, as the vibrator assembly 23 is rocked counterclockwise (as viewed in FIGURE 1), to elevate the ribbon supports, the ends of arms 24 and 25 follow an arcuate path which would cause the ribbon supports to follow an arcuate path were it not for the shape of the cam slots 28a and 29a. That is to say, that the path of motion of the ribbon supports is adjusted and changed by the cam follower pins 30 and 31 which engage the cam slots 28a and 29a to pivot the ribbon supports around their respective pins 24a and 25a. Thus, by shaping the arcuate cam slots 28a and 29a to be non-concentric with the arcuate paths of movement of arms 24 and 25, the ribbon supports may be positioned in a vertical plane during the rocking of arms 24 and 25, thereby to present ribbon R in a vertical plane at the printing position. In other words, the arcuate movement of arms 24 and 25 is converted into linear vertical movement of supports 130 and 27. Conventional carbon ribbon usually measures about 5/16"; for reasons detailed below I prefer to use a carbon ribbon about ½″ wide. Accordingly, the depth of the ribbon receiving slots 130a and 27a in supports 130 and 27 is slightly greater than ½″, the supports being provided with ribbon retaining fingers 26b and 27b which help to maintain the ribbon flat in a vertical plane as it is reciprocated during operation of the vibrator.

An actuating arm, generally indicated at 34, is pivotally mounted on a pin 35 carried by frame 20 and includes a crank 36 and a bifurcated drive arm 37, crank 36 and arm 37 being secured together in any suitable manner so as to oscillate as a unit about pin 35. As shown in FIGURE 2, the lower end 36a of crank 36 is bifurcated to receive a pin 38 carried by a lever 39 fastened to a drive shaft 40 adapted to be oscillated by a suitably driven bell crank 70 (FIGURE 1B) whereby actuating arm 34 is rocked forth and back about pin 35.

The two sides 37a and 37b (FIGURE 1) of drive arm 37 have identical elongated slots 41 formed respectively therein through which extends a pin 42 that also extends through a slot 43 formed in a bichrome lever 44 whose lower end is pivotally connected to frame 20 in any suitable manner. It may be seen that pin 42 may ride forth and back in slots 41 and up and down in slot 43 for a purpose described below.

As shown in FIGURE 1A vibrator arm 25 includes a body 45 and a shoulder 46 the latter having a slot 47 formed therein having a bottom edge 48 and which is wider at its open end 47a than at its closed end 47b. This slot is adapted to receive pin 42 at any of the three positions, A, B and C, to which it is selectively adjustable by manipulation of lever 44. As will become apparent hereinafter, position A is a fabric ribbon position operative to impart a full stroke to the vibrator arms so that typing will occur on the lower field of a fabric ribbon. Position B is a fabric ribbon position as well as a carbon ribbon position. With the apparatus conditioned for fabric ribbon and with lever 44 in the B position the vibrator arms can effect only a partial stroke so that typing will occur on the upper field of a fabric ribbon; with the apparatus conditioned for carbon ribbon and with lever 44 in the B position the vibrator arms will effect partial and full strokes alternately. Position C is a stencil position and is used when the apparatus is conditioned for fabric ribbon. Vibrator body 45 and shoulder 46 lie between the sides 37a and 37b of arm 37 and when the parts are in their normal position (FIGURE 2) the bottom edges of slots 41 are in registry with bottom edge 48 (FIGURE 1A) of slot 47, pin 42 resting thereon in its B position. If now lever 39 is driven counterclockwise (FIGURES 1 and 2) actuating arm 34 will be rocked clockwise thus forcing pin 42 against slot edge 48 on vibrator arm 25 causing this arm as well as arm 24 to rock counterclockwise and partially elevate ribbon supports 26 and 27.

Figure 1B:
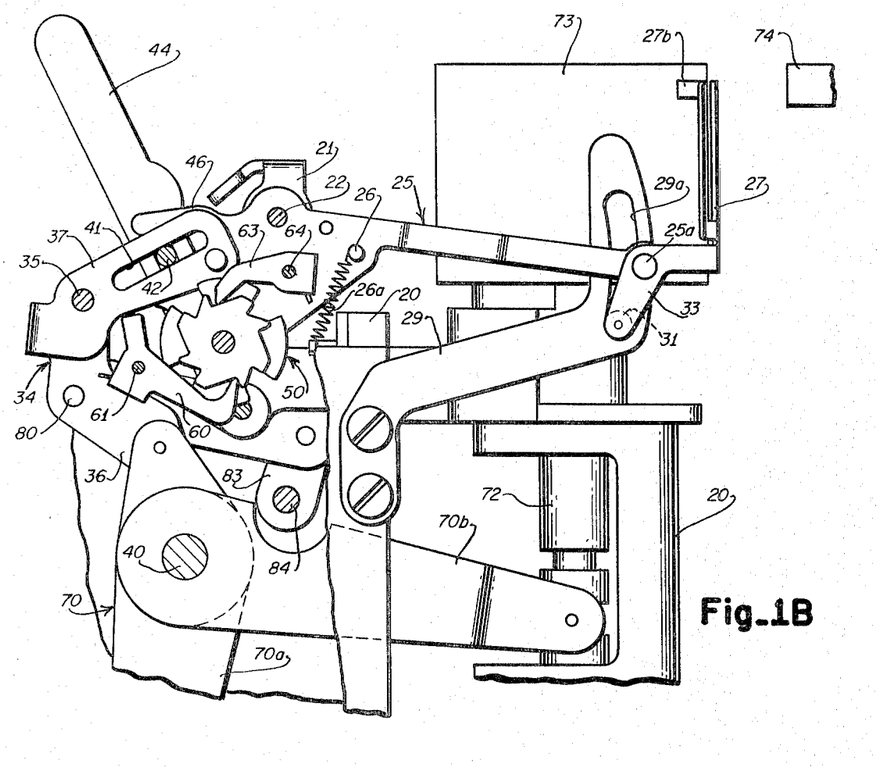
FIGURE 1B is a fragmentary elevation showing the relation between the vibrator and printing head.
Figures 2, 2A:
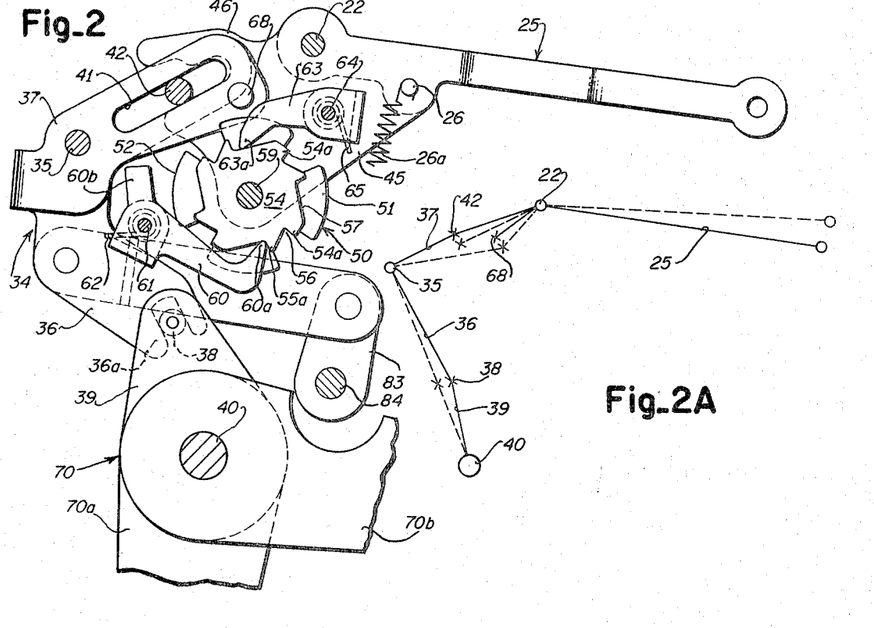
FIGURE 2 is a side elevation showing a portion of the vibrator mechanism in normal or inactive position.
FIGURE 2A is a diagrammatic view of the several parts of the mechanism in their transition from the FIGURE 2 to the FIGURE 3 position.

As shown in FIGURE 1B, shaft 40 is mounted on a part of frame 20. As noted above bell crank 70 is secured to shaft 40 and has an arm 70a that is connected to the drive mechanism (not shown) of the machine. The other arm 70b of bell crank 70 is drivingly connected in any suitable manner to a shaft 72 reciprocally mounted in frame 20, the upper end of this shaft carrying a matrix or printing head 73. Vibrator arms 24 and 25 (FIGURE 1) straddle head 73 (FIGURE 1B) as also do ribbon supports 130 and 27 which accordingly support the ribbon near the printing head at the printing position during a printing operation. Thus when crank 70 is driven head 73 and ribbon supports 130 and 27 are elevated so that a type character on head 73 and the ribbon are presented at the printing position where a hammer 74, driven by any suitable mechanism (not shown) effects an imprint in the well known manner.

*Full and partial stroke mechanism*

Figure 8:
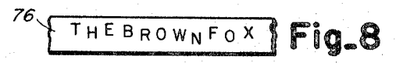
FIGURE 8 is an illustration of a piece of used conventional carbon ribbon.
Figure 9:
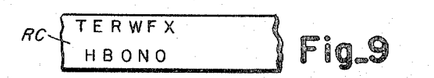
FIGURE 9 is an illustration of a piece of carbon ribbon as it appears after use in the vibrator of this invention.
Figure 10:
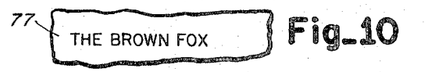
FIGURE 10 is an illustration of copy resulting from the use of either the FIGURE 8 or FIGURE 9 ribbon.
Figure 11:
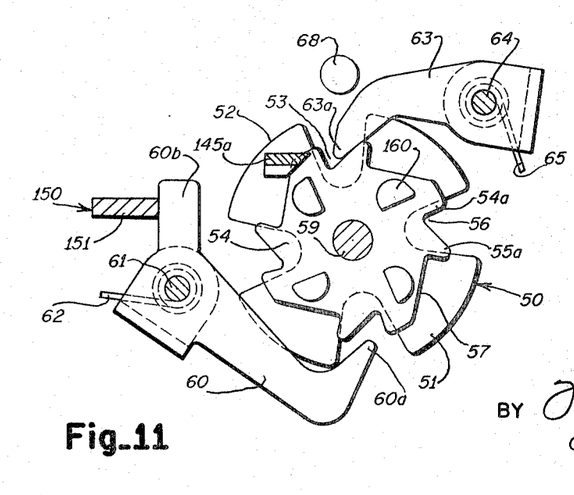
FIGURE 11 is a side elevation of a cam ratchet and pawl combination comprising part of the vibrator.
Figure 12:
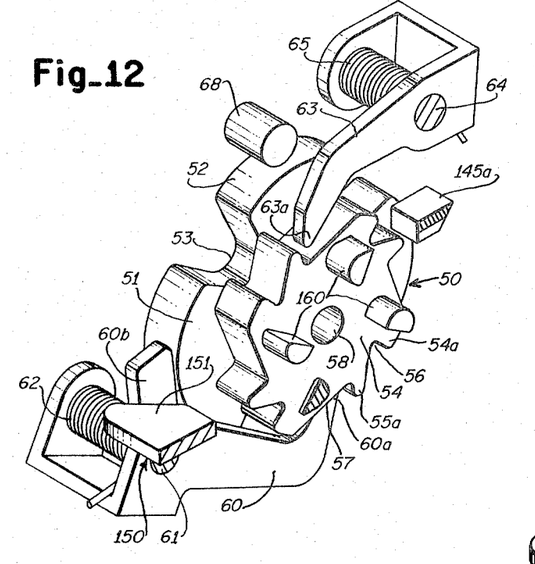
FIGURE 12 is an isometric view of the cam, ratchet and pawl combination shown in FIGURE 11.

As noted above, one of the objects of the invention is to conserve carbon ribbon and materially reduce the incidence and inconvenience of replacing used with new ribbon. A conventional carbon ribbon 76 after use is illustrated in FIGURE 8, this ribbon being about 5/16″ wide. The misalignment of the characters is typical and results from flutter of the flimsy strip as it shuttles between rest and printing positions. Indeed it has been known to happen in very high speed typewriter operation that the ribbon flutter is occasionally so great that only a fraction of a character will be printed. As also noted above, I prefer to use a carbon ribbon about ½″ wide. In FIGURE 9 I have illustrated the appearance of such a ribbon RC after use. Through utilization of mechanism to be described, the characters occur in two lines with successive characters in the upper and lower lines being spaced but one half of an escapement space and being in horizontal alignment, the latter characteristic resulting from use of a wider than normal ribbon, with resulting reduction in flutter, the support attained by ribbon supports 130 and 27 as described above and a ribbon feeding device described below. FIGURE 10 illustrates copy 77 produced by either of the FIGURE 8 or FIGURE 9 ribbons.

In order to attain the letter character relationship shown in FIGURE 9 the vibrator arms 24 and 25 are alternately driven full and partial strokes. On the full stroke the ribbon is given maximum elevation and accordingly prints through the lower half. On the partial stroke the ribbon prints through the upper half as it is elevated less than on the full stroke. After each imprint, the escapement mechanism (not shown) in the machine advances the carriage so that the succeeding imprint is properly spaced from the preceding one. The ribbon feed mechanism, however, advances the ribbon only one half of an escapement space between successive half and full strokes of the vibrator resulting in the staggered letter character relation shown in FIGURE 9. Thus with a ribbon only slightly wider than a conventional one, the printing capacity of a spool of ribbon is substantially doubled as accordingly is its replacement period. As the cost of the ½″ ribbon is substantially the same as the 5/16″ size the economy and convenience attained are apparent.

Referring to FIGURES 1, 2, 11 and 12, I provide a cam and ratchet combination, generally indicated at 50, which may be integrally molded from a suitable plastic such as nylon, for example. The cam 51 of the combination preferably takes the general form of a Maltese cross and comprises symmetrically arranged cam surfaces 52 with adjacent surfaces being separated by radially extending valleys 53 respectively. In other words, surfaces 52 and valleys 53 are arranged in quadrature. The ratchet of combination 50 comprises a wheel 54 (FIGURE 11) having teeth 54a and 55a arranged in quadrature, the latter being arcuately spaced from teeth 54a. Thus the ratchet 54 has, in effect, four arcuately spaced pairs of teeth, each pair comprising a tooth 54a and a tooth 55a with the valley 56 between each pair of teeth being generally aligned with the adjacent valley 53 of cam 51. A relatively elongated cam surface or land 57 extends between each tooth 54a and its adjacent counterclockwise tooth 55a on ratchet wheel 54, the lands 57 respectively lying adjacent to cam surfaces 52 but being spaced radially inwardly thereof.

Cam and ratchet combination 50 has an axial hole 58 whereby it may be rotatably mounted on a pin 59 (FIGURES 1 and 2) secured to the lower portion of arm body 45. Thus when arm 25 is rocked up and down as described above, cam and ratchet 50 move with body 45, rotation of the cam and ratchet being effected as a result of down movement of the arm as will be described below. A pawl 60 (FIGURES 1, 2 and 11) is pivotally mounted on a pin 61 secured to frame 20 and is biased counterclockwise by a spring 62 so that its tooth 60a tracks along the path defined by teeth 54a and 55a on ratchet wheel 54. Another pawl 63 is pivotally mounted on a pin 64 secured to vibrator arm body 45 and is biased counterclockwise by a spring 65 so that its tooth 63a tracks over the same path as that of pawl tooth 60a. Cam and ratchet combination 50 together with pawl 60 coact with a drive pin 68 (FIGURES 1 and 2) mounted on drive arm 37 to effect the alternate full and half stroke drives of vibrator arms 24 and 25, referred to hereinabove, in a manner now to be described.

*Carbon ribbon operation—full stroke*

The vibrator mechanism shown in various conditions in FIGURES 2–7 is directed mostly to carbon ribbon vibration and accordingly no reference, in this connection will be made to fabric ribbon vibration. The full stroke operation of the vibrator will be described first. For brevity, the movements of vibrator arm 25 only will be referred to, it being understood that vibrator arm 24 partakes of the same movements.

As shown in FIGURE 2, the several parts are in inactive or rest position but are conditioned for a full stroke vibrator cycle. Thus pin 42 is centrally positioned in drive arm slot 41 where it may be forced downwardly by the top edge of the slot against the bottom edge 48 of vibrator arm shoulder slot 47 (see also FIGURE 1A) when drive arm 37 is driven clockwise in the manner described above. Also cam 51 is so positioned that its twelve o'clock surface 52 slightly underlies a drive pin 68 secured to drive arm 37 so as to be engaged by the pin after partial downward movement thereof by arm 37.

Figures 3, 3A:
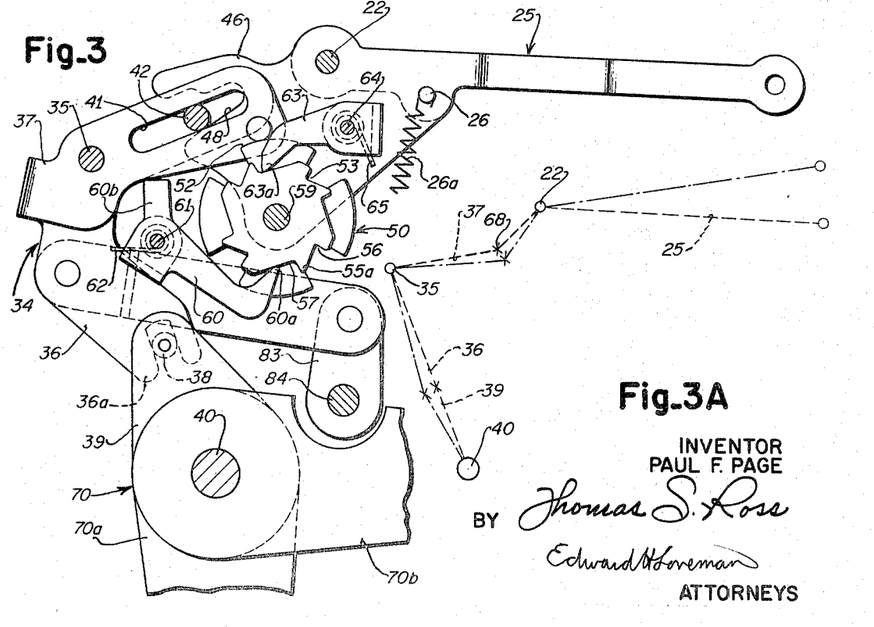
FIGURE 3 is an active view showing the vibrator moved upwardly from its FIGURE 1 position.
FIGURE 3A is a diagrammatic view showing the transition of the parts from the FIGURE 3 to the FIGURE 4 position.

As shown in FIGURE 3, arm 37 has driven pin 42 downwardly from its FIGURE 2 position and in so doing has rocked vibrator arm 25 upwardly about pivot 22, the moment arm for this portion of the upward movement of the vibrator arm extending between the centers of pin 42 and pivot 22. Also this extent of movement of drive arm 37 moves drive pin 68 into engagement with said surface 52 of cam 51, the centers of pin 68 and pivot 22 now constituting the moment arm for vibrator arm 25 which is shorter than moment arm 42–22. During this movement of arm 25, its body 45 rocks counterclockwise carrying cam and ratchet 50 with it so as to move ratchet tooth 55a (at five o'clock) away from tooth 60a of pawl 60, land 57 of the ratchet accordingly sliding across the pawl tooth. FIGURE 2A diagrammatically illustrates the transition of the mechanism from the FIGURE 2 condition to that of FIGURE 3, the full lines indicating the FIGURE 2 condition, the FIGURE 3 condition being shown in broken lines. From this diagram it may be seen how drive pin 68 takes over from pin 42 (the broken line position) with consequent shortening of the moment arm from 42–22 to 68–22 and with lengthening of the power or drive arm 37 from 35–42 (full line) to 35–68 (broken line). Thus the leverage is maximum at the start of the cycle where inertia is maximum and momentum minimum, and minimum when inertia is minimum and momentum has been attained. Also during this portion of the cycle, velocity of the several lever arms smoothly increases from zero to maximum.

Figures 4, 4A, 4B:
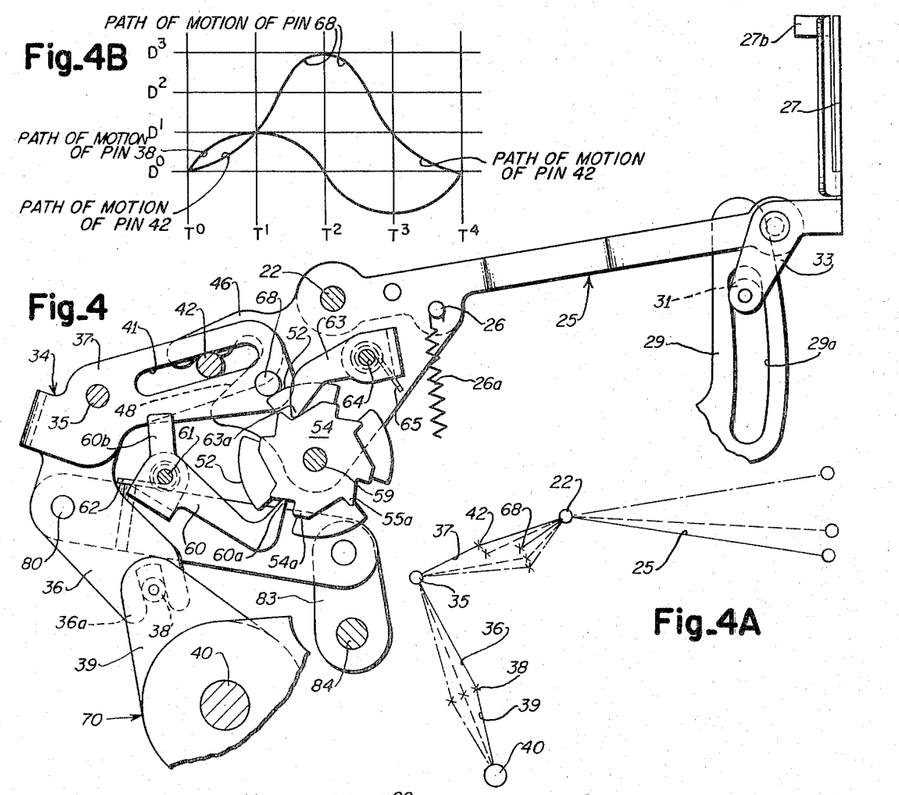
FIGURE 4 is an active view showing the vibrator at full stroke up with the lower portion of the ribbon opposite the printing position.
FIGURE 4A is a composite of FIGURES 2A and 3A.
FIGURE 4B is a chart showing the movement of the vibrator through a full stroke cycle of operation.

As crank 36 continues to drive arm 37 clockwise from the FIGURE 3 position to that shown in FIGURE 4, the full up stroke of vibrator arm 25 is completed. As pointed out above, at the FIGURE 3 position, pin 68 has taken over from pin 42 to transfer the driving force of drive arm 37 to pin 68. Thus pin 68 bears downwardly against surface 52 of cam 51, which, being fastened to arm 25 by pin 59, continues to rock the arm upwardly as drive pin 68 forces the cam down. This action continues until the end of the forward stroke of crank 36 at which time arm 25 and ribbon support 27 reach their uppermost positions. At this point return spring 26a reaches its maximum tension. It should be noted that follower pin 31 on ribbon support lever 33 stops short of the top of slot 29a thus to avoid a jarring and noisy impact against guide 29.

FIGURE 3A diagrammatically illustrates the transition of the mechanism from its FIGURE 3 condition (broken lines) to that of FIGURE 4 (dot-dash lines). Thus it will appear that as crank 36 and power arm 37 move from their broken line to their dot-dash line positions, arm 25 decelerates, with its velocity becoming zero at the top of the arm's stroke where ribbon support 27 presents the lower half of ribbon R at the printing position. Thus the vibrator arm 25 and accordingly the ribbon support and ribbon are smoothly decelerated, greatly reducing the tendency of the flimsy ribbon to flutter and making possible the letter character alignment shown in FIGURE 9.

The complete cycle of crank pin 38, drive pins 42 and 68 and arm 25 is illustrated in the chart shown in FIGURE 4B, where the symbol T represents time and the symbol D represents displacement, a half cycle (FIGURES 2–4) being diagrammatically shown in FIGURE 4A which is a composite of FIGURES 2A and 3A. Thus at rest position (FIGURE 2) crank and drive pins 38 and 42 are shown at $T^0$–$D^0$ in FIGURE 4B. From FIGURE 2 position to FIGURE 3 position the pins move to $T^1$–$D^1$ and arm 25 accelerates from $T^0$–$D^0$ to $T^1$–$D^1$. At this point pin 68 takes over the drive from pin 42, as described above, and moves from $T^1$–$D^1$ to $T^2$–$D^3$ while crank pin 38 moves from $T^1$–$D^1$ to $T^2$–$D^0$, arm 25 accordingly decelerating to a stop at $T^2$–$D^3$ which marks the top of its full upstroke at the end of the first half of the cycle.

During movement of arm 25 from the FIGURE 3 to the FIGURE 4 position, cam and ratchet 50 (FIGURE 4) are swung farther away from tooth 60a of pawl 60 so that at the end of the full stroke of arm 25, the pawl tooth has slid over ratchet tooth 54a (at six o'clock) and rests clockwise of this tooth.

Vibrator arm 25 and ribbon support 27 having completed their full up stroke, return spring 26a becomes effective to return the parts from the FIGURE 4 to the FIGURE 6 position wherein the mechanism is in condition for a partial stroke cycle. As noted above, at the top of the full stroke, pawl tooth 60a (FIGURE 4) rests against ratchet 54 close to or against six-o'clock tooth 54a. Accordingly as arm 25 is pulled down or clockwise by spring 26a, ratchet 54 is swung to the left causing six-o'clock tooth 54a to engage pawl tooth 60a. As ratchet 54 continues to swing to the left to the FIGURE 5 position, the ratchet is rotated or indexed by pawl 60 counterclockwise moving five-o'clock tooth 55a (FIGURE 4) to four-o'clock (FIGURE 5) and eleven-o'clock tooth 55a (FIGURE 4) to ten-o'clock (FIGURE 5) away from tooth 63a of pawl 63. During this movement cam surface 52 slides along and bears against drive pin 68 which, being under the control of crank 36, can move no faster than the crank and accordingly acts as a governor for arm 25 during its movement by spring 26a to the FIGURE 5 position. This action is diagrammatically illustrated in FIGURE 4A, i.e. arm 25 and the other parts move from the dot-dash positions to the broken line positions under the bias of return spring 26a. Thus, with reference to FIGURE 4B, arm 25 and pin 68 accelerate from $T^2$–$D^3$ to $T^3$–$D^1$ at which point pin 42 is engaged by shoulder slot edge 48 and takes over the governing action of pin 68.

Figure 5:
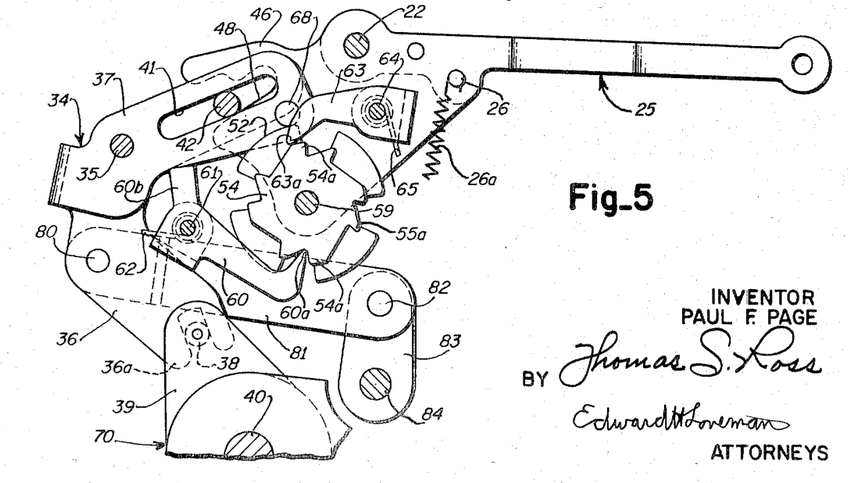
FIGURE 5 is an active view showing the vibrator at half stroke down on return to its FIGURE 1 position.
Figure 6:
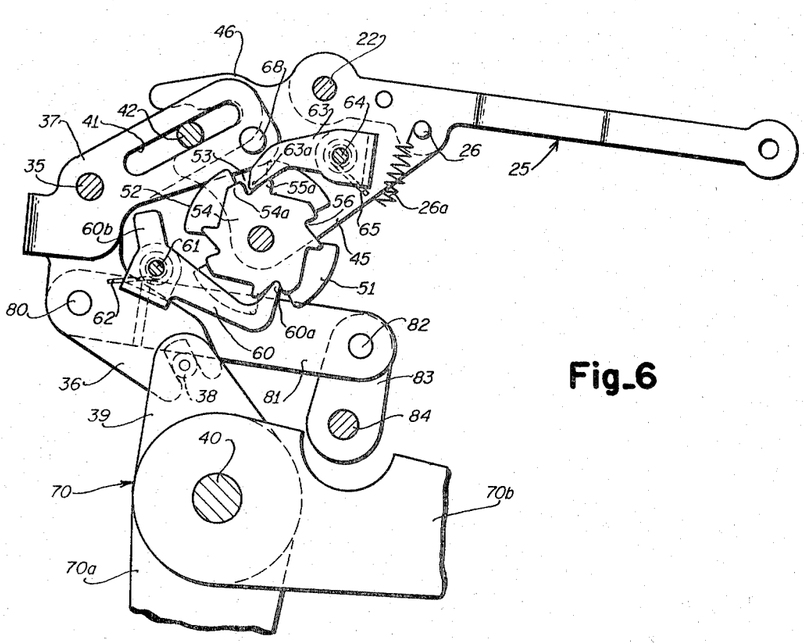
FIGURE 6 is a view showing the vibrator in inactive position but in condition for a half stroke cycle.
Figure 7:
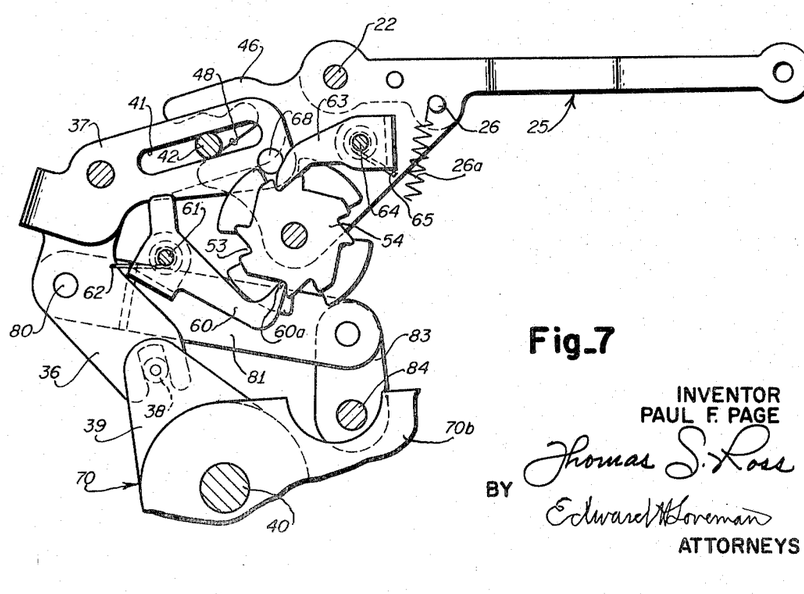
FIGURE 7 is an active view showing the vibrator at half stroke up in the half stroke cycle.

As the parts continue to move from the FIGURE 5 position to the FIGURE 6 or rest position ratchet 54 continues to index counterclockwise causing twelve-o'clock tooth 54a (FIGURE 5) to ride under and past pawl tooth 63a to eleven-o'clock (FIGURE 6) at which point cam valley 53 underlies pin 68. Thus cam and ratchet 50 has been indexed a suitable extent from the FIGURE 2 position. Also the several members of the linkage (see FIGURE 4A) move from the broken line position to their rest position (solid lines) and the mechanism is conditioned for a partial stroke cycle. This last portion of the return cycle is illustrated on the chart (FIGURE 4B). Thus pin 42 (which is now governing the return stroke of arm 25) and arm 25 decelerate from $T^3$–$D^1$ to $T^4$–$D^0$, the end of the full stroke cycle.

*Partial stroke*

As noted above the several parts of the mechanism when in their FIGURE 6 positions, are conditioned for a partial vibrator stroke cycle whereby the upper half of the carbon ribbon is presented at the printing position. Thus twelve-o'clock cam valley 53 underlies drive pin 68, which, accordingly, cannot engage any portion of cam 51; pawl tooth 63a rests in twelve-o'clock ratchet valley 56 between eleven-o'clock tooth 54a and one-o'clock tooth 55a; and pawl tooth 60a rests in five-o'clock ratchet valley 56 counterclockwise of six-o'clock ratchet tooth 55a. Accordingly, upon actuation of drive arm 37, drive pin 42 rocks vibrator arm to the FIGURE 7 position (see also FIGURE 3A). In so doing drive pin 68 enters cam valley 53 and exerts no driving force on cam 51 and arm 25 as would impart a full stroke to the arm as described above. Hence the full throw of drive pin 42 imparts a partial stroke to arm 25 as to present the upper half of the carbon ribbon at the printing position and tension return spring 26a.

During such partial upstroke of arm 25, ratchet 54 is swung to the right away from pawl tooth 60a which accordingly slides over six-o'clock ratchet tooth 55a and comes to rest (FIGURE 7) clockwise of this tooth. Thus upon downward return movement of arm 25 by return spring 26a, ratchet 54 is indexed counterclockwise by pawl tooth 60a bearing against the face of six-o'clock ratchet tooth causing the ratchet and accordingly cam 51 to index to the FIGURE 2 position wherein the twelve-o'clock cam surface 52 underlies drive pin 68 to complete the partial stroke cycle and recondition the parts for a full stroke cycle. It may now be seen that successive full and partial strokes of vibrator arm 25 and ribbon support 27 result in the type character disposition shown in FIGURE 9.

Thus in brief, during the first half cycle of operation, arm 25 is driven a full or partial stroke, depending on whether a cam surface 52 or a cam valley 53 is positioned under drive pin 68 at the start of the cycle. During the second half of the cycle, cam 51 is indexed to position the next cam surface or valley, as the case may be, beneath pin 68 in preparation for the start of the next cycle. Accordingly, the upper and lower halves of the ribbon, or vice versa, are alternately presented at the printing point.

It should be noted in connection with FIGURE 1A that the full stroke-partial stroke operation is effected only when drive pin 42 is in the B position and pawl 60 is in an operative position relative to ratchet 54. When, as will hereinafter appear, the apparatus is conditioned for fabric ribbon, pawl 60 will be rendered inoperative and cam 50 will be rotated to present a cam valley 53 in the path of pin 68, so that with drive pin 42 in the B position only a partial stroke operation is possible. If pin 42 is moved to position A by manipulation of lever 44 only a full stroke will result as the moment arm 42–22 is shortened to the same length as moment arm 68–22 described above. The exclusive partial or full stroke operations are provided when it is desired to use a two color fabric ribbon instead of a carbon ribbon as will be described in greater detail below. Pin position C is provided so that no ribbon vibration occurs during a printing cycle as where the typist is cutting a stencil. With pin 42 in this position it will be seen that the pin cannot engage vibrator arm slot edge 48 upon actuation of drive arm 37; hence arm 25 will not be driven.

While the foregoing description has been directed to a ribbon vibrator for use on a matrix typewriter wherein the vibrator moves with the matrix or printing head which, in effect, constitutes the platen, it is to be understood that this mechanism may, with minor modification, be used with equal effectiveness in a machine having a conventional horizontally movable platen.

*Ribbon feed*

A conventional carbon ribbon can be used but once, i.e. it may not be reversed when the supply spool is exhausted. On the other hand, a one or two color fabric ribbon is reusable. Accordingly, the ribbon feed mechanism must be capable of feeding carbon ribbon in one direction only through the ribbon supports and also must be capable of feeding a one or two color fabric ribbon in forward and reverse directions. Thus when the ribbon vibrator is set for carbon ribbon, the ribbon feed mechanism should be so conditioned that it will feed ribbon only in proper direction, i.e. from the supply to the take-up spool. Still further provision should be made, when two color fabric ribbon replaces carbon ribbon, to assure that the vibrator is in proper condition to present the color band selected at the first printing operation thus to avoid spoilage of copy and waste of time. It is accordingly another object of this invention to provide such a mechanism.

*Fabric ribbon*

Figures 14, 14A, 15:
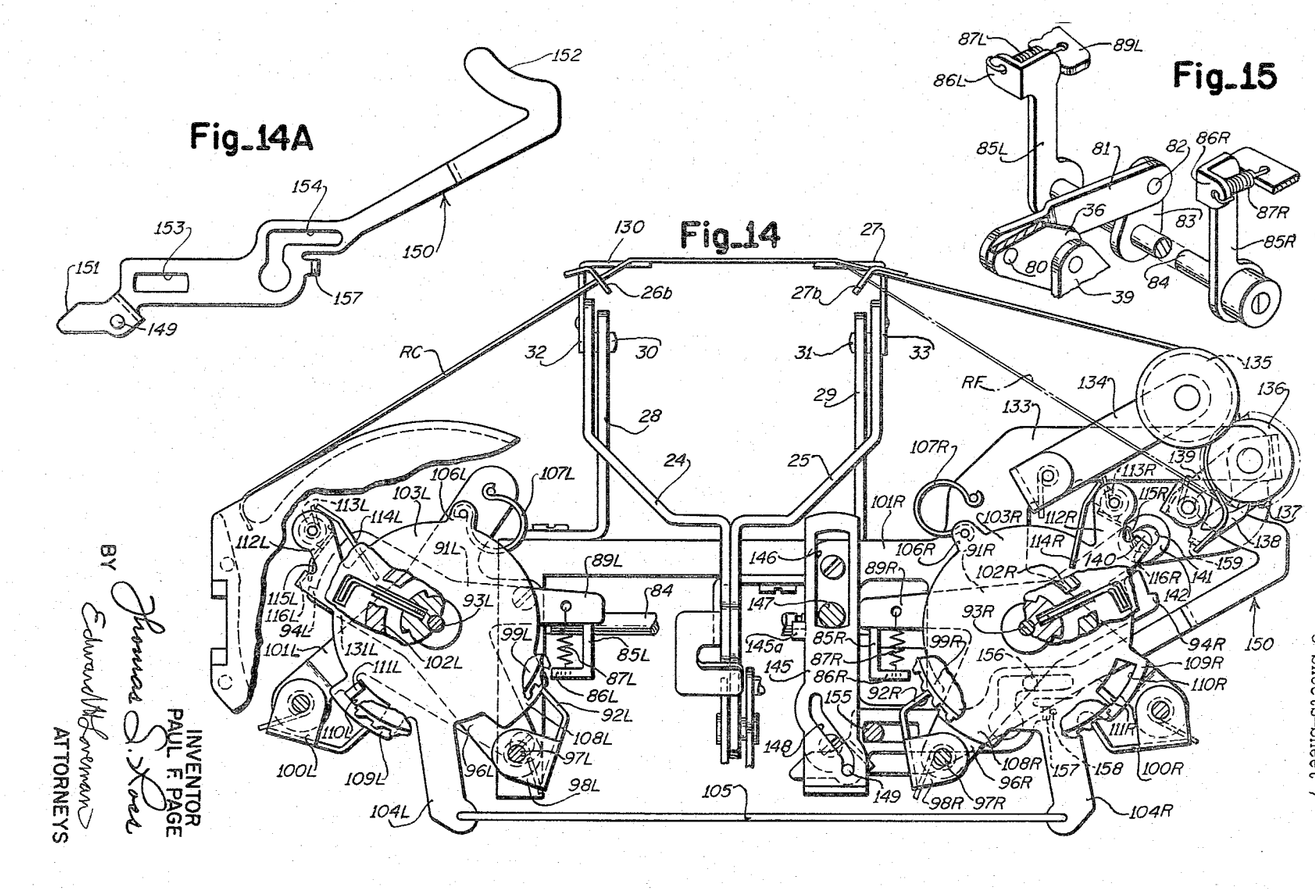
FIGURE 14 is a top view of the ribbon feed mechanism employed in combination with the vibrator.
FIGURE 14A is a detail of a portion of the FIGURE 14 mechanism.
FIGURE 15 is a fragmentary isometric view of the ribbon feed drive.

The ribbon feed mechanism and the drive therefore are shown in FIGURES 14 and 15 respectively. Crank 36 is pivotally secured as by a pin 80 to one end of a link 81 the other end of which is pinned by a pin 82 to a lever 83 fastened to a shaft 84 mounted in frame 20 for oscillatory movement. Thus, when crank 36 is driven about pivot 35 in the manner described above to rock the vibrator arms, link 81 and lever 83 oscillate shaft 84.

A pair of actuating arms 85L and 85R are connected to the ends of drive shaft 84 respectively so as to oscillate therewith, the upper ends of these arms being provided with spring anchor lugs 86L and 86R to which the outer ends of springs 87L and 87R are respectively attached. The inner ends of these springs are respectively connected to legs 89L and 89R of drive forks 91L and 91R which are respectively pivotally mounted on a pair of ribbon spool spindles 93L and 93R secured indirectly to the machine frame 20. Springs 87L and 87R resiliently hold arms 85L and 85R against fork legs 89L and 89R thus to impart a cushioned drive thereto in counter-clockwise direction (FIGURE 15) and a positive drive in clockwise direction which is ribbon feed direction of movement. It might be noted that the ribbon feed mechanism, as shown in FIGURE 14, is in condition to feed carbon ribbon, i.e. it is conditioned to feed ribbon from a supply spool 102L on spindle 93L to a take-up spool 102R on spindle 93R, the latter accordingly being driven as will be described in detail below.

Figure 20:
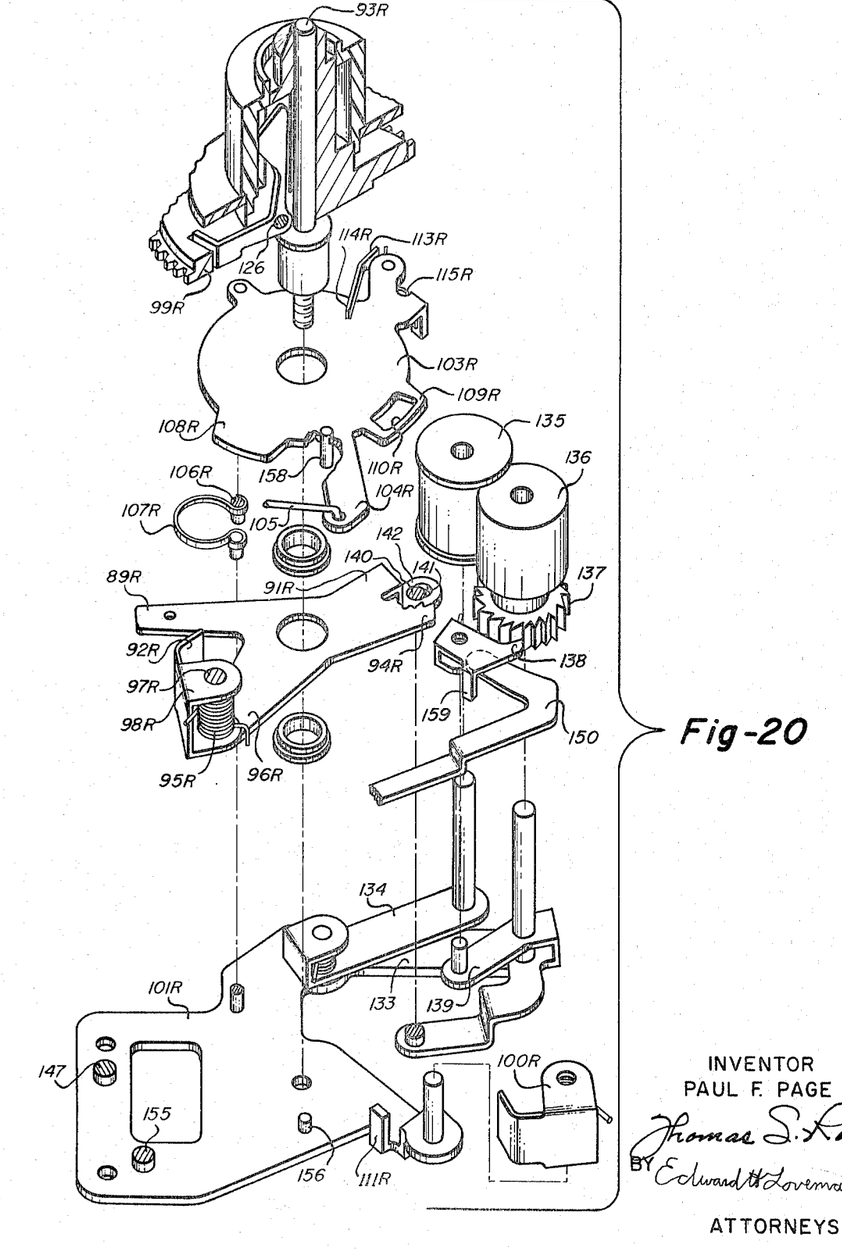
FIGURE 20 is a fragmentary exploded isometric view of the right hand portion of the ribbon feed mechanism.

With reference to FIGURES 14 and 20 (and to FIGURE 16 which shows corresponding left machine parts) fork 91R includes another leg 96R carrying at its end a pin 97R on which a drive pawl 98R is pivotally mounted, the pawl being biased clockwise by a spring 95R so that its tooth 92R may drivingly engage a ratchet wheel 99R mounted on spindle 93R. Thus when actuating arm 85R is driven clockwise (FIGURE 15) after an imprint has been made, fork 91R (FIGURE 14) is pivoted clockwise causing pawl 98R to drive ratchet 99R a distance of one ratchet tooth per cycle to wind ribbon. A no-back pawl 100R is spring biased against the ratchet to prevent reverse rotation thereof during ribbon feed. This pawl is pivotally mounted on a base plate 101R that underlies fork 91R and a reversing disc 103R that is pivotally mounted on spindle 93R, plate 101R being secured to frame 20 in any suitable manner. Disc 103R includes an arm 104R to which is secured one end of a link 105 which connects the right hand spool mechanism with the left hand spool mechanism whereby the mechanisms may be automatically reversed as will be described below. Disc 103R also includes a lug 106R which anchors one end of an overcentering spring 107R the other end of which is secured to plate 101R, this spring being provided to effect fabric ribbon feed reversal as will be described.

A pair of pawl baffles 108R and 109R are formed on disc 103R for disabling feed pawl 98R and no-back pawl 100R respectively when the fabric ribbon feed is reversed by clockwise rotation (FIGURE 14) of disc 103R. A slot 110R is formed in disc 103R adjacent baffle 109R to receive a lug 111R upstruck from base plate 101R, which limits the extent of arcuate counterclockwise movement of disc 103R by spring 107R. An ear 112R projects from disc 103R and pivotally supports a reversing lever 113R having two arms 114R and 115R, the lever being spring biased counterclockwise, arm 115R bearing against a lip 116R on disc 103R to limit its counterclockwise movement.

Spindles 93R and 93L carry ribbon spool mounts, such as mount 120 (FIGURES 17 and 18) adapted to receive a ribbon cartridge generally indicated at 121. The cartridge may be loaded either with carbon (FIGURE 17) or fabric (FIGURE 18) ribbon RC or RF respectively. Mount 120 (FIGURE 18) includes a core 122, having an axial bore 122a which receives spindle 93L, for example. Ratchet 99L preferably comprises an integral part of mount 120, a shoulder 123 being provided to support cartridge 121. Mount 120 is recessed as at 124 to receive a reversing flipper 125 pivotally mounted on a pin 126 and preferably spring urged clockwise, whereby in the absence of fabric ribbon RF it will pivot to its broken line reversing position dropping its arm 125a to a position to engage reversing lever arm 114L (FIGURE 14).

Figures 16, 17, 18:
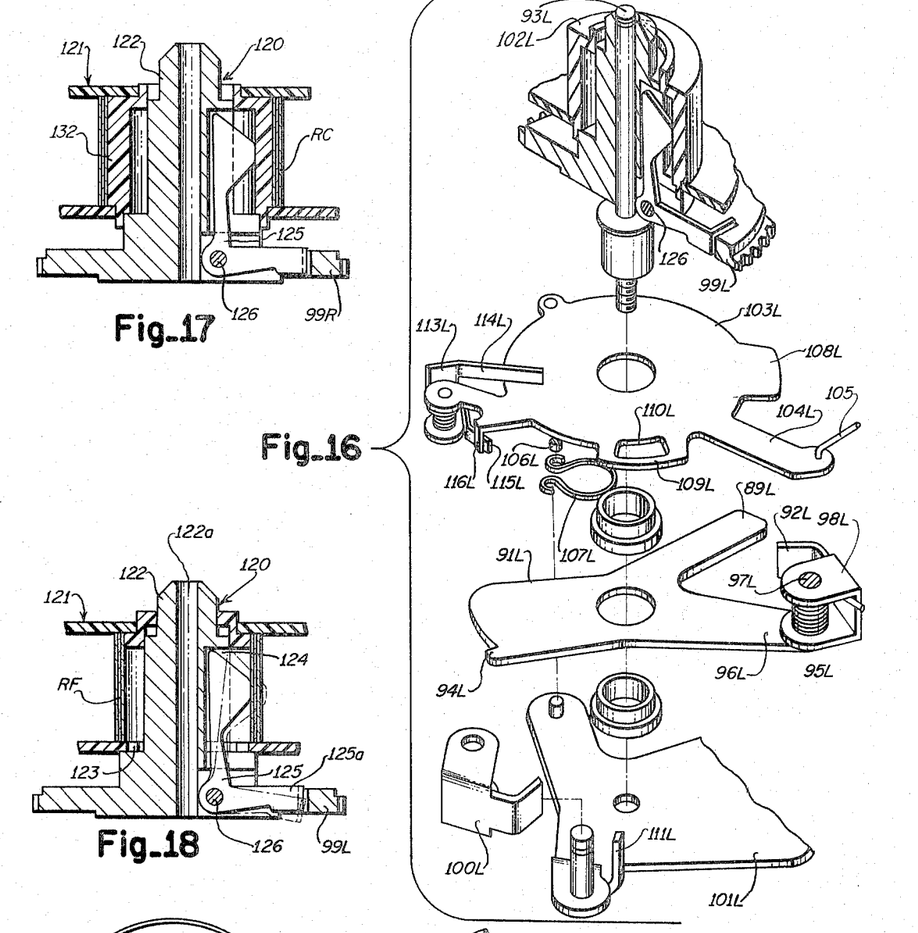
FIGURE 16 is a fragmentary exploded isometric view of the left hand portion of the ribbon feed mechanism, the ribbon spool support being shown in section.
FIGURE 17 is a sectional elevation of a carbon ribbon spool and the support therefor.
FIGURE 18 is a sectional elevation of a fabric ribbon spool and the support therefor.

The left hand portion of the mechanism, insofar as fabric ribbon feed is concerned, is substantially identical to the right hand portion just described, similar left hand elements accordingly being designated by the suffix "L." Thus, as more clearly shown in FIGURE 16, the left hand portion includes the several elements 89L, 91L–101L, 103L, 104L, 106L–111L, 113L–116L, and 126 which are identical to right hand elements 89R, 91R–101R, 103R, 104R, 105, 106R–111R, 113R–115R, and 126, shown in FIGURE 20, with the exception of base plates 101R and 101L and discs 103R and 103L; plate 101R and disc 103R having portions that come into use only when carbon ribbon is used as will be described below.

Figure 19:
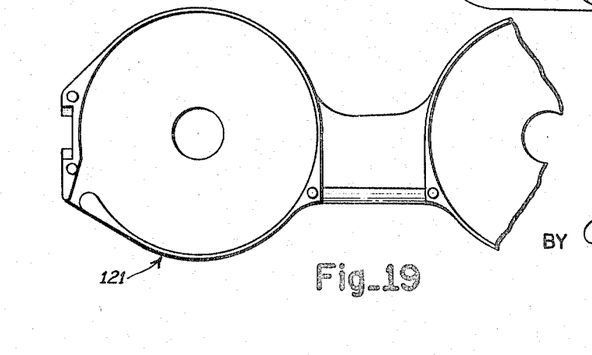
FIGURE 19 is a fragmentary bottom plan view of a ribbon cartridge.

Assuming the mechanism to be loaded with a cartridge 121 (FIGURES 14 and 19) carrying two color fabric ribbon RF with the ribbon substantially exhausted from the left hand spool, flipper arm 125a drops to the broken line position (FIGURE 18) where, upon continued clockwise movement of ratchet 99L, it will ultimately engage reversing lever arm 114L and rock lever 113L counterclockwise against the bias of its spring thereby to move its other arm 115L counterclockwise into the path of movement of a tip 94L on leg 131L of fork 91L. When the fork is driven clockwise, its tip 94L will engage arm 115L and accordingly drive disc 103L and its arm 104L clockwise. This movement of the disc swings its baffles 108L and 109L away from drive and no-back pawls 98L and 100L respectively thus permitting their engagement with ratchet 99L whereby continued oscillation of fork 91L now drives ratchet 99L counterclockwise to wind ribbon on its spool. It should be noted that after fork tip 94L drives reversing pawl 113L and accordingly disc 103L part way, spring 107L overcenters to complete the reversing action of the pawl and disc.

By virtue of the connecting link 105 (FIGURE 14) between discs 103L and 103R, the latter is also swung clockwise thus to interpose its baffles 108R and 109R between ratchet 99R and drive and no-back pawls 98R and 100R respectively to immobilize these pawls and permit the right hand spool to free wheel as ribbon is withdrawn therefrom. When the right hand spool is substantially exhausted of ribbon it is reversed in the same manner as described with respect to the left hand spool.

*Carbon ribbon feed*

When carbon ribbon rather than fabric ribbon is used, the left hand spool in cartridge 121 is always the supply spool and accordingly free wheels during ribbon feed, whereas the right hand spool in the cartridge is always the take-up spool and is accordingly driven in take-up direction, clockwise in FIGURE 14, by drive pawl 98R. A carbon ribbon spool is shown in FIGURE 17 as a part of ribbon cartridge 121 and comprises a core 132 on which, in the case of the right hand or take-up spool, carbon ribbon RC is wound during ribbon feed operation. Core 132 is adapted to be mounted on post 112, any suitable driving connection, such as a friction fit, for example, between core 132 and post 122 being provided. It will be noted that when core 132 is in place it holds flipper 125 in inoperative position thus to preclude automatic reversal of the mechanism.

As shown in FIGURES 14 and 20, base plate 101R includes a support 133 on which an arm 134 is pivotally mounted and spring biased clockwise, a carbon ribbon pressure roller 135 being carried by the free end of the arm. A carbon ribbon feed roller 136 is rotatably mounted on the end of support 133 and has a ratchet 137 attached thereto and adapted to be driven by a pawl 138 pivotally mounted on the upper leg of a U-shaped lever 139 and spring biased counterclockwise toward ratchet 137. Lever 139 is pivotally secured at one end to support 133, the end of the lower leg of lever 139 having a drive pin 140 mounted thereon which extends through a slot 141 formed in a tab 142 that projects from fork 91R. It may now be seen that when fork 91R is oscillated as described above, tab 142 drives pin 140 to rock arm 139 forth and back causing pawl 138 to drive ratchet 137 and feed roller 136 incrementally counterclockwise which with roller 135 tension the ribbon and feed it toward the right hand take-up spool which is driven as described above to wind the used ribbon thereon. Ratchet 137 is so toothed that the ribbon feed increment is about one half of a letter space thus resulting in the staggered type character arrangement shown in FIGURE 9.

As pointed out above, it is necessary, when carbon ribbon is being used, that the ribbon be fed in one direction only, namely from left to right (FIGURE 14) in the embodiment of the invention disclosed. Accordingly, means are provided to assure that ratchet 99R is driven so that its associated spool will be the take-up spool. Thus a bar 145 is slidably mounted in any suitable manner on frame 20 and has a slot 146 through which a limit pin 147, fastened to the frame, extends to limit sliding movement of the bar. Bar 145 also has a diagonal cam slot 148 therein through which a pin 149 extends. This pin is mounted on one end of a slide arm, generally indicated at 150 (see FIGURE 14A), the opposite ends of this arm being in the form of cams 151 and 152 respectively. The arm is provided with a pair of guide slots 153 and 154 through which extend frame mounted pins 155 and 156 respectively. Pin 149 is also mounted on arm 150. A pusher lip 157 extends from arm 150 and is adapted to engage a pin 158 secured to disc 103R and rotate the disc to its FIGURE 14 position when the arm is moved to the right, that being the position of the disc which permits the driving relation between pawl 98R and ratchet 99R. Cam 152 on arm 150 is adapted to engage a lip 159 on carbon ribbon feed pawl 138, when the arm is moved to the left (for fabric ribbon feed), to swing the pawl away from ratchet 137 and thus disable feed roller 136.

Arm 150 is operated by bar 145. Thus when carbon ribbon is to be used bar 145 is slid to its FIGURE 14 position. In so moving, arm pin 149 rides along dagonal bar slot 148 and arm 150 is forced to the right moving its cam 152 away from pawl 138 to permit the pawl to engage and accordingly drive ratchet 137 and ribbon feed roller 136.

*Substitution of fabric for carbon ribbon*

As pointed out above when a fabric ribbon such as a two color fabric ribbon is installed, the lever 44 will be positioned in the A or B positions depending on whether the upper or lower band of the fabric ribbon is to be used. Further as noted above bar 145 is pulled outwardly from the FIGURE 14 position when fabric ribbon is installed and thereby, as described below, will cause the cam 50 to rotate and present a cam valley 53, if it is not then so positioned, to pin 68 whereby pin 42 will do all the vibrator driving; a partial stroke when in the B position and a full stroke in the A position. The movement of bar 145 to the fabric position also disengages pawl 60 so that no movement of the cam and ratchet can occur.

Figure 13:
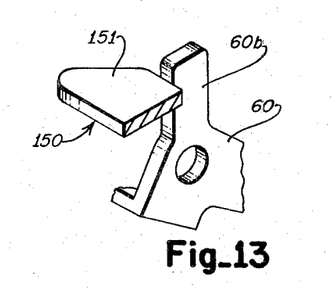
FIGURE 13 is a fragmentary isometric view of one of the pawls of FIGURE 12 and an actuating cam therefor.

The cam 151 (FIGURES 11–13) is adapted, upon movement of arm 150 to the left, to engage a lug 60b on pawl 60 and pivot the pawl out of engagement with ratchet 54 accordingly precluding indexing operation of cam and ratchet 50. Also bar 145 (FIGURE 14) is provided with a cam 145a (see also FIGURES 11, 12) which is adapted to engage one or another of studs 160, extending in quadrature from ratchet 54, if one of the studs happens to lie in the path of movement of cam 145a. As adjacent studs lie at opposite sides of a cam valley 53, engagement of one of them by bar 145, as it moves from the FIGURE 12 to the FIGURE 11 position, rotates cam 52 sufficiently to position one of its valleys 53 beneath drive pin 68 thus disabling the pin and precluding an improper up stroke of the vibrator arms. Thus the selected color band of the fabric ribbon as determined by the setting of bichrome lever 44 (FIGURE 1A) will be presented at the printing position on the first up stroke of the vibrator arms.

It may now be seen that I have provided a ribbon handling mechanism that attains the several objects set forth above in a thoroughly practical and efficient manner.

As other embodiments of the invention are possible and as changes may be made in the one disclosed without departing from the scope of the invention it is to be understood that the foregoing should be interpreted as illustrative and not in a limiting sense.

I claim:

1. Typewriter ribbon feeding mechanism for operation in a first mode with a carbon ribbon being wound from a carbon ribbon supply spool to a carbon ribbon take-up spool and for operation in a second mode with a fabric ribbon being wound from a fabric ribbon supply spool to a fabric ribbon take-up spool comprising,
   a frame,
   a vibrator arm rockably mounted on said frame and having a ribbon support secured thereto,
   two ribbon spindles each adapted to be frictionally coupled to either a different one of said carbon ribbon spools or a different one of said fabric ribbon spools,
   ribbon spindle index means to unidirectionaly irreversibly rotate a predetermined one of said spindles a character space increment during each type stroke in said first mode of operaton and to undirectionally rotate either of said ribbon spindles a character space increment during each type stroke in said second mode of operation,
   tensioning means to engage and transport said carbon ribbon in said first mode of operation only,
   drive means reciprocally operative through a uniform stroke in synchronism with each typing cycle,
   engaging means connecting said ribbon spindle index means and said tensioning means to said drive means,
   disengaging means for disconnecting said tensioning means from said engaging means in said second mode of operation,
   and coupling means for connecting said drive means to said vibrator arm.

2. Mechanism according to claim 1 wherein said coupling means in said first mode of operation includes variable coupling means conditionable in response to successive typing strokes whereby the amplitude of movement imparted to said vibrator arm by said drive means alternately varies about a reference amplitude, said disengaging means in said second mode of operation being operative to disable said variable coupling means.

3. Mechanism according to claim 1 wherein said engaging means drives said predetermined ribbon spindle through a distance larger than the distance said tensioning means drives said carbon ribbon.

4. Mechanism according to claim 1 wherein said engaging means drives said predetermined ribbon spindle through twice the distance said tensioning means drives said carbon ribbon.

5. Typewriter ribbon feeding mechanism for unidirectionally reversibly transporting a fabric ribbon from a first ribbon spool to a second ribbon spool or unidirectionally irreversibly transporting a carbon ribbon from a predetermined first ribbon spool to a second ribbon spool comprising,
   a frame,
   a vibrator arm rockably mounted on said frame and having a ribbon support secured thereto,
   a first and second ribbon spindle adapted to frictionally mount either carbon ribbon spools or fabric ribbon spools,
   ribbon spindle mechanism connected to rotate one or the other of said spindles,
   ribbon reversing mechanism mounted on said spindles and operable when the ribbon is exhausted to effect the connection and disconnection of said spindle mechanism from one to the other of said spindles, said carbon ribbon spools rendering said reversing mechanism ineffective when said carbon ribbon spools are mounted on said spindles,
   tensioning means located in close proximity to said second ribbon spindle to transport a carbon ribbon and adapted to be rendered ineffective when a fabric ribbon spool is mounted on said ribbon spindles,
   drive means reciprocally operative through a uniform stroke in synchronism with each typing cycle,
   means connecting said ribbon spindle mechanism and said tensioning means to said drive means,
   coupling means for connecting said drive means to said vibrator arm to effect uniform motion from a rest position when a fabric ribbon is to be used and to effect an alternately varying motion about a reference amplitude when a carbon ribbon is to be used,
   and disabling means adapted when fabric ribbon is to be used to render said tensioning means ineffective and simultaneously to operate on said coupling means so that uniform motion may be transmitted to said vibrator arm and adapted when carbon ribbon is to be used to connect said ribbon spindle mechanism to said second ribbon spindle so that said carbon ribbon will always be transported in only one direction.

References Cited by the Examiner

UNITED STATES PATENTS

| | | | |
|---|---|---|---|
| 493,255 | 3/1893 | Densmore | 197—167 |
| 581,500 | 4/1897 | Webb | 197—167 |
| 662,147 | 11/1900 | Gabrielson | 197—158 |
| 949,257 | 2/1910 | Barney | 197—158 |
| 1,064,703 | 6/1913 | Brown | 197—157 |
| 1,211,203 | 1/1917 | McLaughlin | 197—157 X |
| 2,161,856 | 6/1939 | Coxhead | 197—151 |
| 2,692,556 | 10/1954 | Anderson | 197—157 X |
| 2,747,718 | 5/1956 | May | 197—157 |
| 2,840,218 | 6/1958 | Pelton | 197—158 X |
| 2,902,136 | 9/1959 | Whippo | 197—165 |
| 2,919,008 | 12/1959 | Whippo | 197—157 |
| 2,986,260 | 5/1961 | Whippo | 197—151 |
| 3,048,254 | 8/1962 | Morris | 197—151 |
| 3,171,530 | 3/1965 | O'Daniel et al. | 197—151 |

FOREIGN PATENTS

| | | |
|---|---|---|
| 16,563 | 1913 | Great Britain. |
| 381,472 | 10/1932 | Great Britain. |

ROBERT E. PULFREY, *Primary Examiner.*

E. T. WRIGHT, *Assistant Examiner.*